(No Model.)

H. T. FOUNTAIN.
HARNESS.

No. 308,485. Patented Nov. 25, 1884.

WITNESSES:
Fred. G. Dieterich.
Maurice Delmar.

Hugh T. Fountain
INVENTOR.
By Louis Bagger & Co.
ATTORNEYS.

UNITED STATES PATENT OFFICE.

HUGH T. FOUNTAIN, OF BURNT CORN, ALABAMA.

HARNESS.

SPECIFICATION forming part of Letters Patent No. 308,485, dated November 25, 1884.

Application filed September 29, 1884. (No model.)

*To all whom it may concern:*

Be it known that I, HUGH T. FOUNTAIN, of Burnt Corn, in the county of Monroe and State of Alabama, have invented certain new and useful Improvements in Harness; and I do hereby declare that the following is a full, clear, and exact description of the invention, which will enable others skilled in the art to which it appertains to make and use the same, reference being had to the accompanying drawings, which form a part of this specification, and in which—

Figure 1:
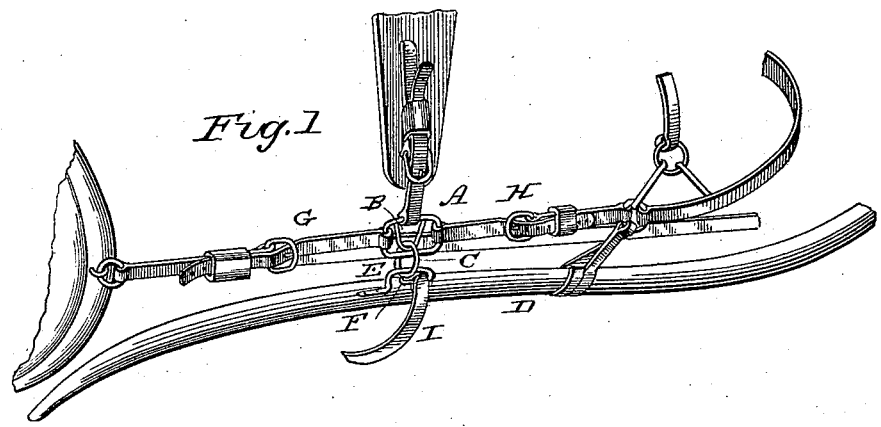
Figure 2:
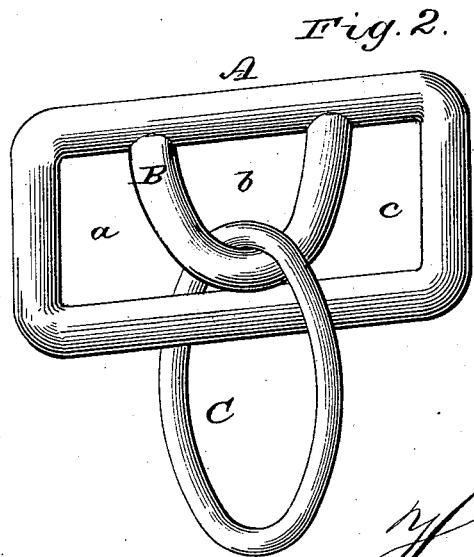

Figure 1 is a perspective view illustrating my invention and the adjoining parts of the harness in position for operation, and Fig. 2 is a perspective view showing the device or attachment removed from the harness.

The same letters refer to the same parts in both the figures.

This invention relates, particularly, to single harness; and it has for its object to provide a device by means of which a horse may be more quickly and conveniently attached to or detached from a buggy or other vehicle than by the ordinary harness now in general use, and which shall be simple in construction, inexpensive, and easily applied.

With these ends in view, the invention consists in the improved construction and arrangement of parts, which will be hereinafter fully described, and particularly pointed out in the claims.

In the drawings, A designates a rectangular frame constructed of malleable iron or other suitable material, and provided with an interiorly-located U-shaped loop, B, suitably connected to the upper and lower sides of the said frame. C is a link arranged as shown in the said loop.

D designates one of the thills, to which is bolted or otherwise secured a hook, E, having a crooked or inturned point, F, for the purpose of preventing the link and strap which are to be adjusted upon the said hook, as will be presently described, from sliding off accidentally.

The loop B divides the frame A into three sections, *a*, *b*, and *c*. The front section, *a*, is connected with the hame by the tug-strap G, which has a buckle, by means of which its length may be properly adjusted. The rear opening or section, *c*, is likewise connected by a strap, H, with the breeching or holdback, and the central section, *b*, is connected with the harness-saddle. The link C is adjusted upon the hook E, as stated, and the belly-band I is likewise adjusted upon the said hook, thereby serving to prevent the link from being displaced.

From the foregoing description, taken in connection with the drawings hereto annexed, the operation and advantages of my invention will be readily understood.

The construction is exceedingly simple and inexpensive, and it enables the horse to be hitched to or detached from a vehicle in a moment's time.

Having thus described my invention, I claim and desire to secure by Letters Patent of the United States—

1. The herein-described harness attachment, consisting of a rectangular frame having a U-shaped loop, and a link fitted in the said loop, substantially as and for the purpose set forth.

2. As an improvement in harness, the herein-described rectangular frame having a U-shaped loop, the said frame being suspended from the harness-saddle, and connected with the hame and the breeching by adjustable straps, as described, in combination with a link arranged in the U-shaped loop, and a hook secured to the thill, substantially as and for the purpose set forth.

In testimony that I claim the foregoing as my own I have hereunto affixed my signature in presence of two witnesses.

HUGH T. FOUNTAIN.

Witnesses:
WILLIE S. NASH,
J. W. COWAN.